(12) United States Patent
Malloy et al.

(10) Patent No.: US 7,874,184 B2
(45) Date of Patent: Jan. 25, 2011

(54) THERMAL PROTECTION SLEEVE WITH KNIT THERMAL PROTECTION FEATURES AND METHOD OF CONSTRUCTION THEREOF

(75) Inventors: Cassie M. Malloy, Blue Bell, PA (US); Zhong Huai Zhang, Pottstown, PA (US); Ellen Bacon, Blue Bell, PA (US); Linwood Ludy, Pottstown, PA (US)

(73) Assignee: Federal-Mogul Powertrain, Inc., Southfield, MI (US)

( * ) Notice: Subject to any disclaimer, the term of this patent is extended or adjusted under 35 U.S.C. 154(b) by 231 days.

(21) Appl. No.: 12/196,715

(22) Filed: Aug. 22, 2008

(65) Prior Publication Data

US 2009/0049869 A1 Feb. 26, 2009

Related U.S. Application Data

(60) Provisional application No. 60/957,494, filed on Aug. 23, 2007.

(51) Int. Cl.
*D04B 1/22* (2006.01)
(52) U.S. Cl. ....................................................... 66/170
(58) Field of Classification Search ............... 66/178 R, 66/179, 180–186, 171, 196
See application file for complete search history.

(56) References Cited

U.S. PATENT DOCUMENTS

| | | | | |
|---|---|---|---|---|
| 1,786,862 A | * | 12/1930 | Mouthe | 66/178 R |
| 4,961,418 A | * | 10/1990 | McLaurin-Smith | 602/21 |
| 4,967,419 A | * | 11/1990 | Elliott | 2/16 |
| 5,413,149 A | | 5/1995 | Ford et al. | |
| 5,675,992 A | * | 10/1997 | Wrightenberry | 66/178 R |
| 5,778,702 A | * | 7/1998 | Wrightenberry | 66/178 R |
| 6,108,820 A | * | 8/2000 | Bernhardt | 2/239 |
| 6,324,698 B1 | * | 12/2001 | Freeman | 2/239 |
| 6,978,643 B2 | * | 12/2005 | Akers et al. | 66/170 |
| 7,200,872 B2 | * | 4/2007 | Gregory | 2/170 |
| 7,469,563 B2 | * | 12/2008 | Wahlgren et al. | 66/169 R |
| 2004/0154070 A1 | | 8/2004 | Gregory | |

FOREIGN PATENT DOCUMENTS

| | | |
|---|---|---|
| JP | 11-311396 A | 11/1999 |
| WO | WO 99/04194 A1 | 1/1999 |
| WO | WO 2004/001780 A2 | 12/2003 |
| WO | WO 2007/084971 A2 | 7/2007 |

* cited by examiner

*Primary Examiner*—Danny Worrell
(74) *Attorney, Agent, or Firm*—Robert L. Stearns; Dickinson Wright, PLLC

(57) ABSTRACT

A knit protective sleeve and method of construction thereof provides a continuous and seamless sleeve wall knit from one or more yarns extending between opposite open ends of the sleeve. At least one heat vent opening is integrally knit within the wall between the ends.

21 Claims, 5 Drawing Sheets

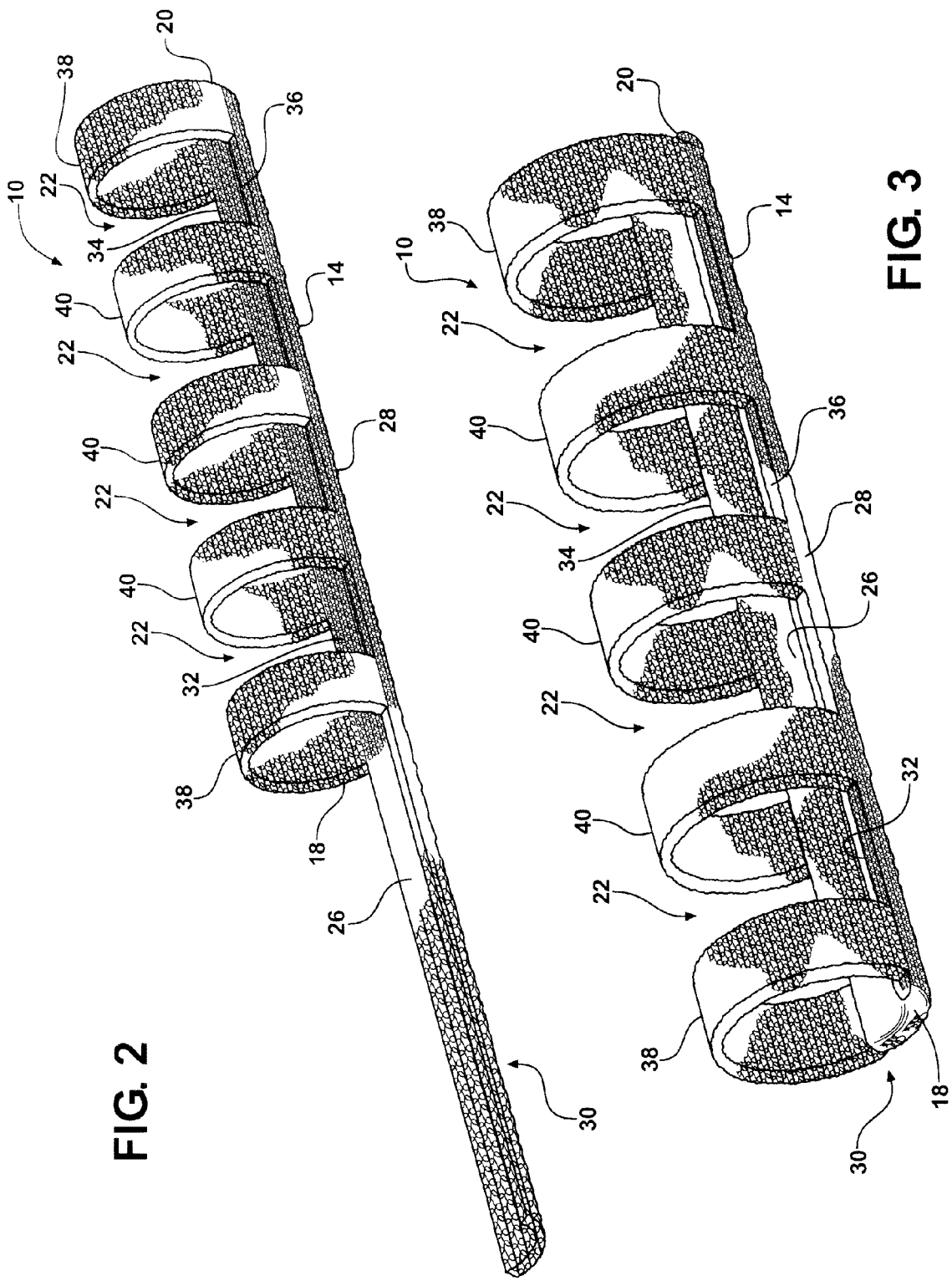

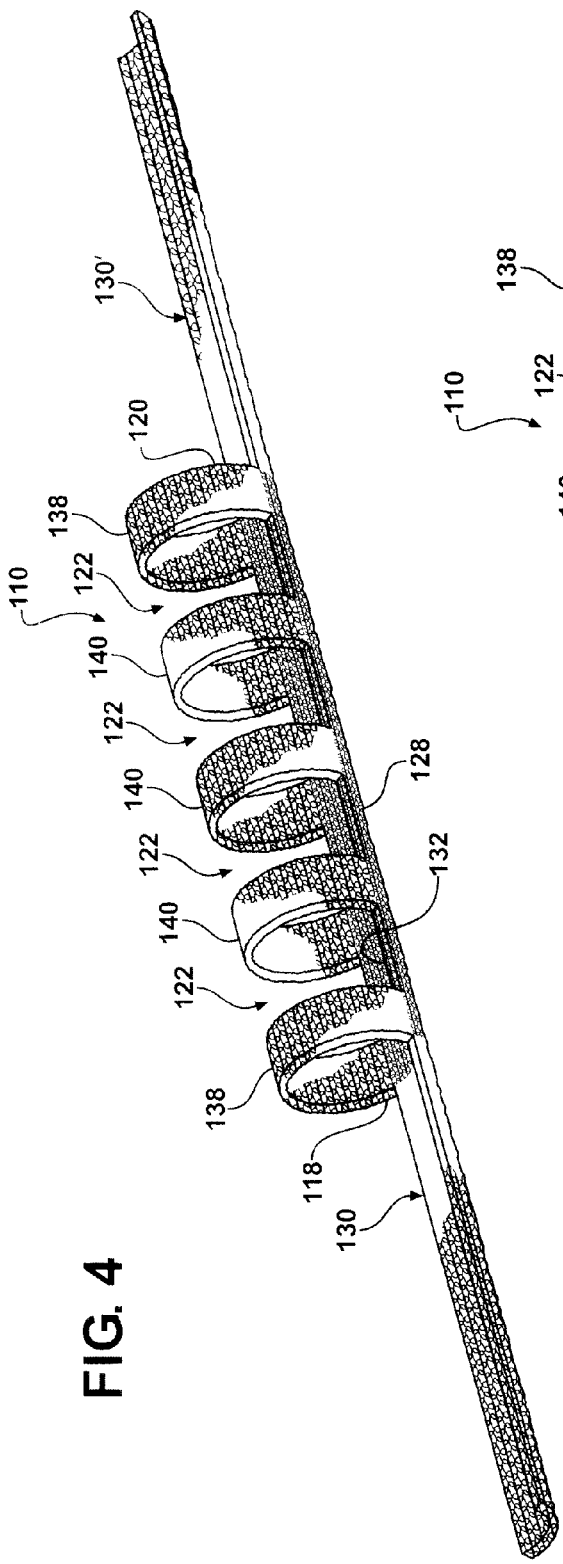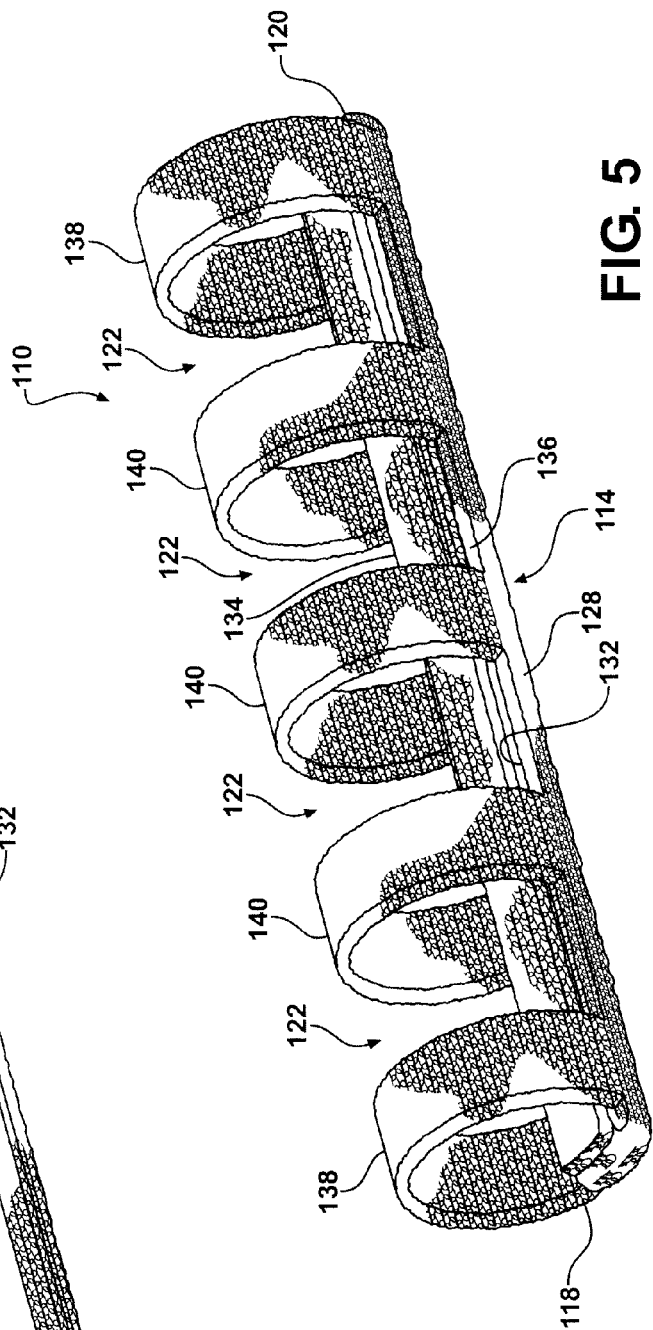

THERMAL PROTECTION SLEEVE WITH KNIT THERMAL PROTECTION FEATURES AND METHOD OF CONSTRUCTION THEREOF

CROSS-REFERENCE TO RELATED APPLICATION

This application claims the benefit of U.S. Provisional Application Ser. No. 60/957,494, filed Aug. 23, 2007, which is incorporated herein by reference in its entirety.

BACKGROUND OF THE INVENTION

1. Technical Field

This invention relates generally to sleeves for protecting elongate members and more particularly to knit tubular protection sleeves.

2. Related Art

Knit tubular sleeves that provide protection from external elements and that provide a barrier to heat radiation from elongate members, such as exhaust pipes, wires and tubing, contained within the sleeves, are known. The sleeves are commonly knit from abrasion resistant, heat resistant, or fire retardant yarns to withstand relatively high temperatures and to allow portions of the sleeve to expand radially. The sleeves are commonly constructed having a continuous, closed tubular wall, such that the sleeves must be slid in sock-like fashion over the item being protected. Given the closed tubular wall construction, sometimes multiple sleeves are used in combination with one another to accommodate protrusions, e.g., sensors, or members branching from the item being protected, wherein adjacent ends of the sleeves are fastened to one another on opposite sides of the respective obstacle. This complicates the assembly process and adds labor/component cost. Otherwise, to avoid using multiple sleeves, some sleeves have an opening formed in the closed wall to accommodate the respective protrusion and/or member branching from the item being protected, or to facilitate locating the sleeve in a stationary position relative to a protrusion from the item being protected. In order to form the opening, or in some cases multiple openings, the closed wall must be slit, thereby resulting in frayed, loose ends of the yarns forming the closed wall. This generally results in unraveling of the yarns forming the sleeve, thereby reducing its ability to perform as intended and reducing its useful life.

As such, to reduce the risk of degrading the usefulness and life of the closed wall sleeve, it is known to form openings in secondary cutting and sewing operations. In the secondary operations, the cut edges forming the opening are sewn to reduce the likelihood of their unraveling. Unfortunately, these secondary operations add cost to the manufacturing process. In addition, the sewn edges provide a potential origin for future unraveling, should the stitches come loose or broken during use.

In addition, sometimes multiple closed wall portions of a sleeve or sleeves are overlapped with one another to form a multilayered sleeve to minimize the heat radiation outwardly from the item covered by the sleeve. Although this can be effective in reducing heat from radiating outwardly from the sleeve(s), it also retains the heat next to the covered item, thereby impacting its ability to be cooled. As such, it would be desirable to have a sleeve capable of both preventing heat from radiating outwardly in selected areas, while also being able to expel heat from the covered item in other areas to allow the item to be cooled.

Knit sleeves manufactured in accordance with the present invention, among other things, overcome or greatly minimize any limitations of the known sleeves described above.

SUMMARY OF THE INVENTION

A sleeve for protecting elongate members has an elongate body with a wall extending along a longitudinal axis between opposite ends. The body is constructed from one or more yarns interlinked with one another by a plurality of knit stitches. At least one opening is integrally knit in the body between the opposite ends and diametrically opposite the wall. The wall provides a thermal barrier to heat radiation radially outwardly from the wall and the opening provides a path promoting heat radiation radially outwardly from the opening.

According to another aspect of the invention, the sleeve has at least one elongate flap knit from the yarn or yarns, wherein the flap is foldable to abut at least a portion of the wall to provide a multilayered wall.

According to another aspect of the invention, the wall is knit having a first knit stitch pattern and the flap is knit having a second knit stitch pattern, wherein the first knit stitch pattern is different from the second knit stitch pattern.

A method of constructing a sleeve for protecting an elongate member received therein and for providing a thermal barrier to heat radiation is provided. The method includes providing knitting machine and knitting one or more yarns with knit stitches to form an elongate body having an insulating wall extending between opposite ends of the sleeve with the insulating wall being configured to prevent heat from radiating through the wall. Further, the method includes knitting at least one opening concurrently with the wall with the opening being configured diametrically opposite the wall and being sized to promote heat radiation through the opening.

According to another aspect of the invention, the method includes weft knitting the sleeve on a flat bed knitting machine.

According to another aspect of the invention, the method includes knitting the wall having a pair of free edges extending along a longitudinal axis of the sleeve and knitting a plurality of circumferentially extending strap portions and bounding the at least one opening peripherally by the strap portions and the opposite free edges.

According to another aspect of the invention, the method includes knitting at least one elongate flap knit with the one or more yarns, with the flap being foldable to abut at least a portion of the wall to provide a multilayered wall.

BRIEF DESCRIPTION OF THE DRAWINGS

These and other aspects, features and advantages of a knit thermal sleeve constructed in accordance with the present invention will become more readily appreciated when considered in connection with the following detailed description of presently preferred embodiments and best mode, appended claims and accompanying drawings, in which:

FIG. 2 is a schematic perspective side view of a thermal sleeve constructed according to another aspect of the invention shown in an unfolded state;

FIG. 3 is a schematic perspective view of the thermal sleeve of FIG. 2 shown in a reverse folded state;

FIG. 4 is a schematic perspective side view of a thermal sleeve constructed in accordance with another aspect of the invention shown in an unfolded state;

FIG. 5 is a schematic perspective view of the thermal sleeve of FIG. 4 shown in a reverse folded state;

DETAILED DESCRIPTION OF PRESENTLY PREFERRED EMBODIMENTS

Figure 1:
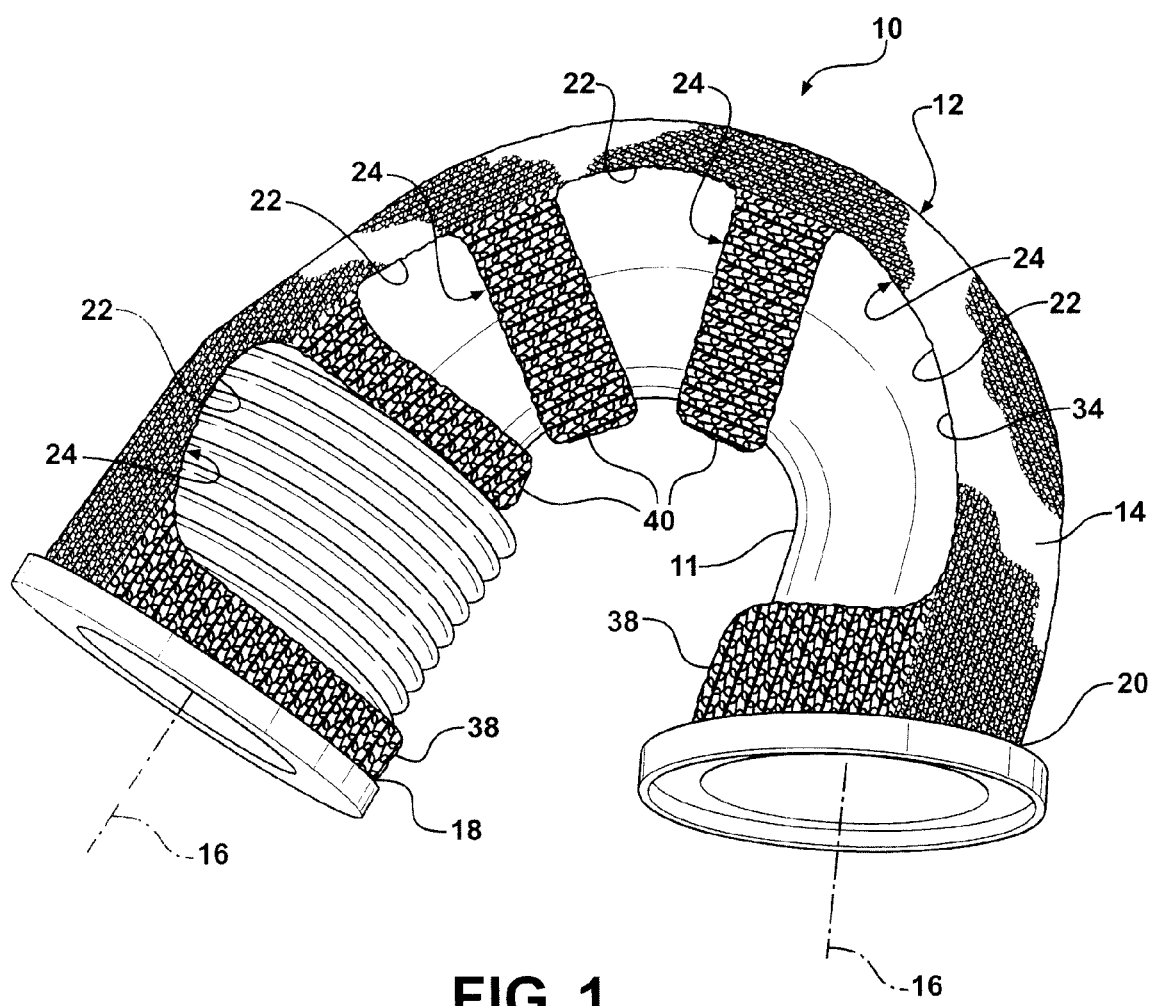
FIG. 1 is a schematic perspective view of a thermal sleeve constructed according to one aspect of the invention shown assembled on an exhaust pipe.

Referring in more detail to the drawings, FIG. 1 illustrates a knit thermal sleeve 10 constructed according to one aspect of the invention for protecting heat generating elongate members, such as an exhaust pipe 11, for example. The sleeve 10 has an elongate body, shown generally at 12, having a wall 14 extending along a longitudinal axis 16, shown here as conforming to a bend in the pipe 11, between finish knit opposite ends 18, 20 of the sleeve 10. The sleeve 10 has at least one, and represented here, by way of example and without limitation, as a plurality of thermal vent openings, referred to hereafter as openings 22, wherein the openings 22 are knit in the same continuous knitting operation used to knit the body 12. The openings 22 can be knit having any size and shape using a predetermined series of needle and stitch transfers, as desired, to provide the desired amount of heat radiation outwardly from the sleeve 10. As such, the sleeve 10 can be constructed having the wall 14 suitably sized and positioned on the pipe 11 to provide a thermal barrier to heat radiation radially outwardly from the wall 14, while the openings 22 can also be suitably sized and configured to provide an intended path promoting heat radiation radially outwardly through the openings 22. Thus, nearby objects, such as temperature sensitive sensors, for example, or other temperature sensitive components can be protected from heat radiation by orienting the wall 14 between the pipe 11 and the component, while the openings 22 can be oriented to direct the heat radially outwardly and away from the component. Accordingly, the sleeve 10 provides a thermal barrier in the region of the wall 14 and a thermal flow path in the region of the openings 22. In addition, the ability to knit the openings 22 concurrently with the wall 14 in a single knitting operation negates the necessity to perform secondary operations to form the openings 22. Further, each opening 22 has a periphery 24 formed with continuous, uncut yarn or yarns, and thus, the yarn or yarns forming the respective opening 22 does not unravel, thereby providing the sleeve 10 with a long and useful life. Further yet, with the knit sleeve 10 being directly disposed over the pipe 11 in close abutment therewith, a low clearance heat barrier is provided, and in addition, with the wall 14 being formed of interlinked knit stitches, the wall 14 is able to readily contoured to expand and contract as necessary to conform to the contour of the pipe 11.

The wall 14 is knit from one or more yarns interlinked with one another by a plurality of knit stitches. The yarn or yarns, referred to hereafter simply as yarns unless otherwise specified, can be provided having any suitable characteristics and of any suitable material, such as monofilaments and/or multifilaments of any suitable Tex and material, including fire resistant and/or fire retardant (FR) yarns. If high temperature ratings are desired along with FR capabilities, then some presently preferred yarn materials include basalt, m-Aramid (Nomex, Conex, Kennel), p-aramid (Kevlar, Twaron, Technora), PEI (Ultem), PPS, and PEEK, for example. Further, the yarns can be knit in any suitable stitch and pattern in discrete areas of the sleeve 10. For example, one portion of the wall 14 could be knit with one type of yarn in one knit stitch pattern, and another discrete portion of the wall 14 can be knit with another type of yarn having another knit stitch pattern. As such, a multitude of configurations and performance characteristics are possible, depending on the types of yarns and knit stitch patterns used in constructing the sleeve 10.

As shown schematically in FIG. 2, a sleeve 10 constructed in accordance with another presently preferred embodiment, wherein the same reference numerals are used to indicate similar features as identified in FIG. 1, can be constructed with the wall 14 having multiple thermal wall layers, with one layer being configured as an inner layer 26 for abutment with the pipe 11, and the other layer being configured as an outer layer 28. The inner layer 26 is formed by a reverse folded elongate flap 30 (shown reverse folded in FIG. 3). The flap 30 is knit from at least some of the same yarns used to knit the outer layer 28 of the wall 14, and is shown here as being formed as a continuous knit extension of the outer layer 28 and extending from one of the ends 18 of the finished sleeve 10. The flap 30 can be knit having any suitable length to allow it to be reverse folded to abut an inner surface 32 of the outer layer 28 of the wall 14. The flap 30, thus, can be formed having substantially the same length as the outer layer 28, thereby providing the sleeve 10 with a full length dual thermal protective layers extending the full length of the sleeve 10. However, it should be recognized that the flap 30 could be constructed to extend less than the full length of the sleeve 10, it desired.

The outer layer 28 of the wall 14 and the inner layer 26 of the wall 14 can be knit having different stitch patterns to provide the thermal protection desired. For example, the outer layer 28 can be knit having a first knit stitch pattern, such as a jersey or double jersey knit stitch pattern, while the inner layer 26 can be knit having a second knit stitch pattern, such as a rib knit stitch pattern (2×2 or 2×3, for example). With the outer layer 28 having a more dense knit stitch pattern, it provides an increased barrier to thermal radiation, while the less dense knit stitch pattern of the inner layer 26 provides an increased heat retention capacity, given the inner layer 26 has an increased porosity relative to the outer layer 28. Accordingly, heat is retained within the wall 14 and inhibited from radiating outwardly from the wall 14.

The wall 14 can be constructed to span a portion of the circumference of the sleeve 10, or the entire circumference of the sleeve 10, with the exception of the area occupied by the opening or openings 22. As shown in FIGS. 1-3, the wall 14 spans a portion of the circumference, and is represented as extending between about 25-45 degrees, by way of example and without limitation. The wall 14 has opposite side edges or free edges 34, 36 extending substantially parallel to the longitudinal axis 16, wherein the free edges 34, 36 are finish knit and spaced from one another by the opening 22, such that the free edges 34, 36 bound a portion of the opening 22. As such, the size of the opening 22 determines the length of the free edges 34, 36.

Figure 6:
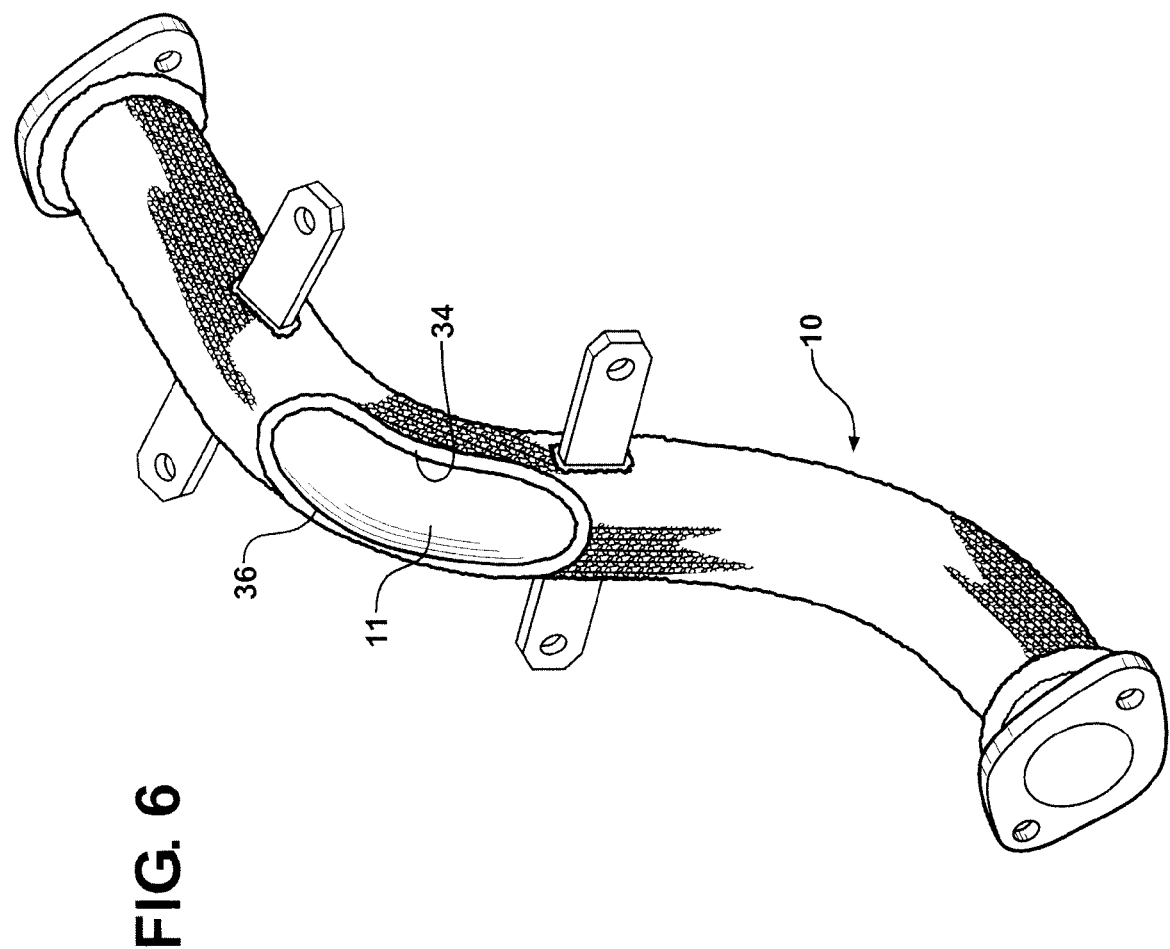
FIG. 6 is a schematic perspective view of a thermal sleeve constructed according to another aspect of the invention shown assembled on an exhaust pipe.

The sleeve 10 has a plurality of strap portions extending substantially transverse to the longitudinal axis 16. A pair of strap portions 38 are represented as extending to the ends 18, 20 to form a portion of the ends 18, 20. In addition, by way of example and without limitation, a plurality of inner strap portions 40 are shown spaced inwardly from the end strap portions 38. The inner strap portions 40 extend continuously between the opposite edges 34, 36 of the wall, and bound portions of the axially spaced openings 22. As such, the number of openings 22 diametrically opposite the wall 14 can be increased or decreased by varying the number of strap portions 40 knit continuously between the opposite edges 34, 36 of the wall 14. Of course, the inner strap portions 40 could be eliminated to provide a single opening 22 bounded by the opposite edges 34, 36, if desired, such as illustrated in FIG. 6. Each of the strap portions 38, 40 is knit with one or more of the yarns forming the wall 14, and thus, the strap portions 38, 40 are knit as continuous lateral extensions of the wall 14. The width of the strap portions 38, 40 extending axially along the length of the sleeve 10 can be varied, such that the openings 22 can be increased or decreased in axial length, depending on the amount of heat radiation desired.

As mentioned above with regard to the wall 14 and the strap portions 38, 40, any size and number of openings 22 can be knit along the length of the sleeve 10, from a single opening to a plurality of openings. Regardless of the size and number, the openings 22 are bound by uncut yarns forming the wall edges 34, 36 and the strap portions 38, 40. The opening or openings 22 can occupy between about 5 to 95 percent of the length of the sleeve, and the width of the opening or openings 22 can extend as great as 10-320 degrees circumferentially about the axis 16, and more preferably between about 45-270 degrees, depending on the size of the wall 14 desired to inhibit heat radiation and the sized of the openings desired to promote heat radiation.

As shown in FIG. 4, wherein the same reference numerals used above offset by a factor of 100 identify similar features as above, a sleeve 110 constructed in accordance with another embodiment is illustrated. The sleeve 110 is generally the same as the sleeve 10, however, a wall 114, rather than having dual layers, has three separate layers to further inhibit heat radiation outwardly from the wall 114. In order to form the three layered wall 114, a pair of flap portions 130, 130' extend from opposite ends 118, 120 of an outer layer 128 of the wall 114. One of the flaps 130 is reverse folded to abut an inner surface 132 of the outer layer 128, and the other flap 130' is then reverse folded to abut an inner surface of the flap 130. Accordingly, the first reverse folded flap 130 is sandwiched between the outer layer 128 and the second reverse folded flap 130'. As described above in relation to the sleeve 10, the flaps 130, 130' can be knit having a different knit stitch and density than the outer layer 128, and further, they can be knit having a different knit stitch and density from one another. As such, the outer layer 128 can be knit having a tight knit stitch density to provide a thermal barrier to heat radiation, such as by using a jersey or double jersey knit stitch, for example. The first flap 130, which forms an intermediate layer, can be knit having a looser knit stitch than the outer layer 128, such as by using a rib knit stitch, such as a 2×2 knit stitch, for example. Then, the second flap 130', which forms the inner most layer, can be knit having a different, and possibly looser knit stitch than the intermediate layer 130, such as a 2×3 knit stitch, for example. With the first and second flaps 130, 130' having different rib knit stitch patterns, the stitches are inhibited from nesting with one another, thereby providing more loft or air between the layers 130, 130'. As such, the thermal insulation is enhanced by providing a built-in heat sink within the layers 130, 130'. Otherwise, the sleeve 110 can be constructed generally the same as described above, including varying the number of straps portions 138, 140 across the length of the sleeve 110, thereby varying the number of openings 122 formed within the sleeve 110.

Figure 7:
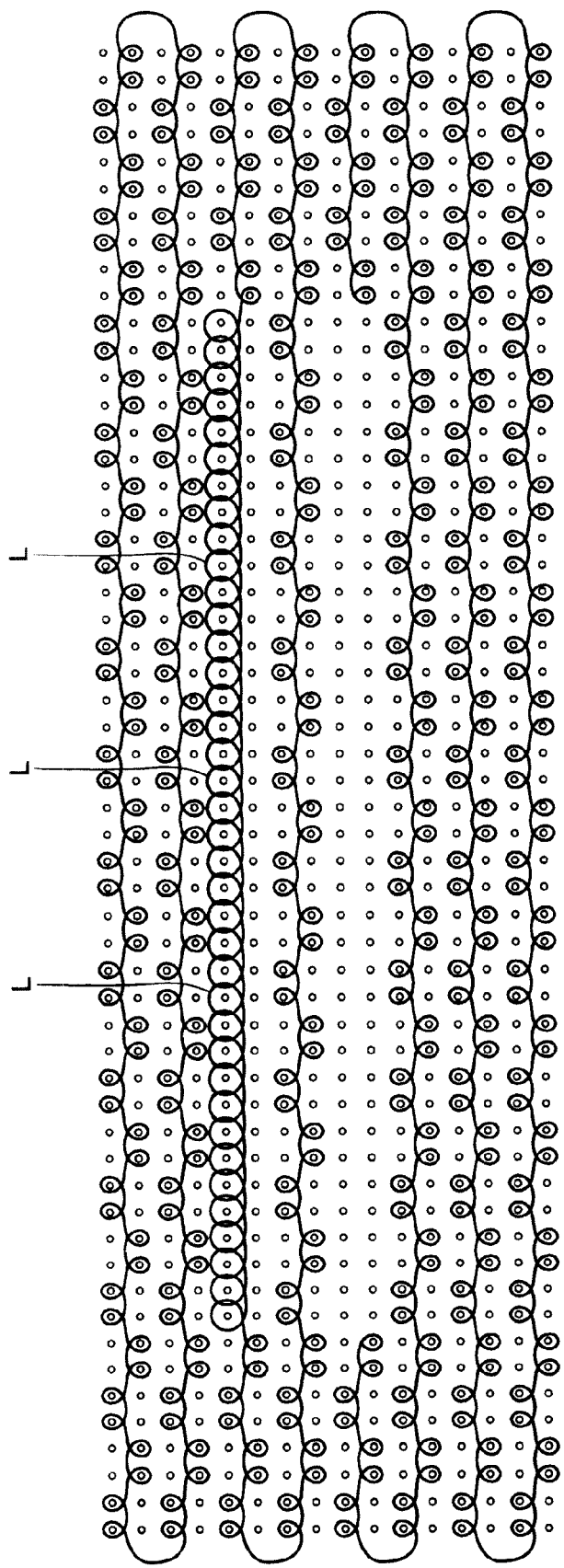
FIG. 7 is a portion of a knit stitch pattern for knitting an integral vent opening in a wall of a thermal sleeve according to one aspect of the invention.

In constructing the sleeve 10, 110, a knitting machine is provided, such as a computerized flat bed weft knitting machine (e.g., Shima Seiki SSG Machine), for example. The sleeve 10, 110 is thus constructed as a flat knit material and continuously knit into the seamless structure. During the knitting operation, the vent openings 22, 122 are knit within the predetermined locations between the integrally knit strap portions 38, 40, 138, 140 and the wall edges 34, 36, 134, 136 along the length of the wall 14, 114, such that the yarn or yarns forming the openings 22, 122 are knit as continuous, uninterrupted and uncut yarns. As such, no secondary operations are needed to form the openings 22, 122. To further prevent unraveling of the yarn or yarns forming the openings 22, 122, the lead-in edge is knit using a "bind-off" stitch, as illustrated in FIG. 7 with the interlinked knit stitch loops (L). Accordingly, the yarn or yarns forming the openings 22, 122 do not have loose free ends that would be prone to unraveling. Accordingly, the finished sleeve 10, 110 exhibits a long and useful life. The knitting can be performed to provide the openings 22, 122 of any suitable length and any suitable shape, such as generally round, oval, square or rectangular, by using a knit stitch pattern, by way of example and without limitation, as shown in FIG. 7.

Obviously, many modifications and variations of the present invention are possible in light of the above teachings. It is, therefore, to be understood that within the scope of the appended claims, the invention maybe practiced otherwise than as specifically described.

What is claimed is:

1. A sleeve for protecting elongate members and for inhibiting heat radiation outwardly from at least a portion of the sleeve, comprising:
    an elongate body having a wall extending along a longitudinal axis of said sleeve between opposite ends of said sleeve, said body being constructed from one or more yarns interlinked with one another by a plurality of knit stitches; and
    at least one opening integrally knit in said body between said opposite ends and diametrically opposite said wall, said wall providing a thermal barrier to heat radiation radially outwardly from said wall and said opening providing a path promoting heat radiation radially outwardly from said opening, wherein said body has a plurality of strap portions extending substantially transverse to said longitudinal axis and said wall has opposite free edges extending substantially parallel to said longitudinal axis, said at least one opening being bounded peripherally by said strap portions and said opposite free edges.

2. The sleeve of claim 1 wherein said sleeve has a plurality of said openings diametrically opposite said wall.

3. The sleeve of claim 2 wherein said openings are bounded peripherally by said strap portions and said opposite free edges.

4. The sleeve of claim 1 wherein a pair of said strap portions extend to said opposite ends.

5. The sleeve of claim 1 wherein said at least one opening is bounded by uncut ones of said one or more yarns.

6. The sleeve of claim 1 wherein said ends are circumferentially finish knit.

7. The sleeve of claim 1 wherein said opening extends axially at least 25 percent of a length between said ends.

8. The sleeve of claim 7 wherein said opening extends axially at least 50 percent of a length between said ends.

9. The sleeve of claim 1 further comprising at least one elongate flap knit from at least some of said one or more yarns, said at least one flap being foldable to abut at least a portion of said wall to provide said wall as a multilayered wall.

10. The sleeve of claim 9 wherein said at least one flap is knit to extend from at least one of said opposite ends.

11. The sleeve of claim 9 wherein said wall is knit having a first knit stitch pattern and said flap is knit having a second knit stitch pattern, said first knit stitch pattern being different from said second knit stitch pattern.

12. The sleeve of claim 11 wherein said first knit stitch pattern is more dense than said second knit stitch pattern.

13. A sleeve for protecting elongate members and for inhibiting heat radiation outwardly from at least a portion of the sleeve, comprising:
   an elongate body having a wall extending along a longitudinal axis of said sleeve between opposite ends of said sleeve, said body being constructed from one or more yarns interlinked with one another by a plurality of knit stitches;
   at least one opening integrally knit in said body between said opposite ends and diametrically opposite said wall, said wall providing a thermal barrier to heat radiation radially outwardly from said wall and said opening providing a path promoting heat radiation radially outwardly from said opening; and
   at least one elongate flap knit from at least some of said one or more yarns, said at least one flap being foldable to abut at least a portion of said wall to provide said wall as a multilayered wall, wherein said at least one elongate flap includes a flap extending from each of said opposite ends.

14. The sleeve of claim 13 wherein one flap is folded to abut said wall and the other flap is folded to abut said one flap to form said wall as having at least three separate layers.

15. A method of constructing a sleeve for protecting an elongate member received therein and for inhibiting heat radiation outwardly from at least a portion of the sleeve, comprising:
   providing knitting machine;
   knitting one or more yarns with one another to form an elongate body having a insulating wall extending between opposite ends of the sleeve with the insulating wall being configured to prevent heat from radiating through the wall;
   knitting at least one opening concurrently with the wall with the opening being configured diametrically opposite the wall and being sized to promote heat radiation through the opening; and
   knitting the wall having a pair of free edges extending along a longitudinal axis of the sleeve and knitting a plurality of strap portions with at least some of the one or more yarns concurrently with the wall and bounding the at least one opening peripherally by the strap portions and the opposite free edges.

16. The method of claim 15 further including weft knitting the body on a flat bed knitting machine.

17. The method of claim 15 further including knitting said at least one opening extending substantially between the opposite ends.

18. The method of claim 15 further including knitting at least one elongate flap knit with the one or more yarns, with the flap being foldable to abut at least a portion of the wall to provide the wall as a multilayered wall.

19. The method of claim 18 further including knitting the at least one flap to extend from at least one of the opposite ends of the wall.

20. The method of claim 18 further including knitting the wall using a first knit stitch pattern and knitting the flap with a second knit stitch pattern that is different from the first knit stitch pattern.

21. The method of claim 20 further including knitting the first knit stitch pattern as a more dense knit stitch pattern than the second knit stitch pattern.

* * * * *